United States Patent
Stauffer

(10) Patent No.: US 7,090,818 B2
(45) Date of Patent: Aug. 15, 2006

(54) CARBON DISULFIDE PROCESS

(76) Inventor: John E. Stauffer, 6 Pecksland Rd., Greenwich, CT (US) 06830

( * ) Notice: Subject to any disclaimer, the term of this patent is extended or adjusted under 35 U.S.C. 154(b) by 541 days.

(21) Appl. No.: 10/351,184

(22) Filed: Jan. 24, 2003

(65) Prior Publication Data

US 2004/0146450 A1 Jul. 29, 2004

(51) Int. Cl.
*C01B 31/26* (2006.01)

(52) U.S. Cl. .................................... 423/443
(58) Field of Classification Search ............... 423/443
See application file for complete search history.

(56) References Cited

U.S. PATENT DOCUMENTS 3,923,957 A * 12/1975 Homberg et al. ........... 423/236
4,122,156 A 10/1978 Kittrell et al. .............. 423/443

* cited by examiner

*Primary Examiner*—Stuart Hendrickson
(74) *Attorney, Agent, or Firm*—Young & Basile, P.C.

(57) ABSTRACT

The specification discloses a process for the manufacture of carbon disulfide from sulfur dioxide and carbon monoxide comprising two catalytic reactions. In the first reaction, sulfur dioxide and carbon monoxide are converted to carbonyl sulfide and carbon dioxide. In the second reaction, carbonyl sulfide is disproportionated to carbon disulfide and carbon dioxide. The second reaction is conducted in the presence of a solvent, which continuously removes the carbon disulfide product so as to drive the reaction to completion.

8 Claims, 1 Drawing Sheet

CARBON DISULFIDE PROCESS

FIELD OF THE INVENTION

The present invention relates to a process for manufacturing carbon disulfide from sulfur dioxide and carbon monoxide employing two catalytic reactions: in the first reaction sulfur dioxide and carbon monoxide are converted to carbonyl sulfide and carbon dioxide, and in the second reaction carbonyl sulfide is disproportionated to carbon disulfide and carbon dioxide.

BACKGROUND OF THE INVENTION

Carbon disulfide is a major industrial chemical, which has a long history of use in the chemical process industries. At one time large quantities of the chemical were used to manufacture viscose rayon, cellophane, and carbon tetrachloride. While these applications have declined, new markets, especially its use as a solvent, show considerable promise.

In the early years of its manufacture, carbon disulfide was produced from charcoal and sulfur at high temperatures in either an electric furnace or a retort. The method was both hazardous and environmentally unsound, but at the time no alternatives were available.

Beginning in the 1960's, a petrochemical process was introduced to manufacture carbon disulfide from natural gas (methane) and sulfur. A great improvement over the old process, this petrochemical technology soon gained dominance. Nevertheless, the petrochemical process was saddled with a major disadvantage: the need to recover sulfur from substantial quantities of byproduct hydrogen sulfide in a Claus unit.

Newer proposals continue to appear for the manufacture of carbon disulfide. One of the most interesting processes was disclosed in U.S. Pat. No. 4,122,156. This process makes carbon disulfide from boiler flue gas by catalytically reducing sulfur dioxide with carbon monoxide to carbonyl sulfide and then converting the carbonyl sulfide to carbon disulfide over an alumina catalyst.

Although this proposal to reduce sulfur dioxide to carbonyl sulfide has considerable merit, the conversion of carbonyl sulfide to carbon disulfide presents certain difficulties. The reaction of carbonyl sulfide to carbon disulfide and carbon dioxide is reversible and does not go to completion under normal conditions. Thus, expensive and inefficient procedures must be employed to get around this limitation.

An object of the present invention is to reduce or eliminate the disadvantages of the prior art in a way which meets the most demanding expectations for safety, environmental responsibility, and efficiency.

These and other objects, features and advantages of the invention will be apparent from the following description and the accompanying drawing.

SUMMARY OF THE DISCLOSURE

In one preferred embodiment of the invention, two reaction steps are operated in tandem to provide a largely self-contained process for producing carbon disulfide from sulfur dioxide and carbon monoxide.

A first reaction step consists of the reaction of sulfur dioxide with carbon monoxide in the presence of a catalyst to form carbonyl sulfide and carbon dioxide. This reaction essentially goes to completion.

A second reaction step is used to convert the carbonyl sulfide from the first reaction step to carbon disulfide and carbon dioxide. This reaction is promoted by a catalyst. In order to drive this reaction to completion, carbon disulfide is continuously removed by a solvent that circulates through the reaction zone in intimate contact with the catalyst.

The solvent containing carbon disulfide from the second reaction step is regenerated by stripping it with a gas, which most conveniently is carbon monoxide. The carbon disulfide is condensed from the saturated carbon monoxide before the latter is introduced to the first reaction step. In this fashion any traces of unreacted carbonyl sulfide are contained within the system.

BRIEF DESCRIPTION OF THE DRAWING

The invention will be better understood by reference to the accompanying drawing.

DETAILED DESCRIPTION OF THE PROCESS

Figure 1:
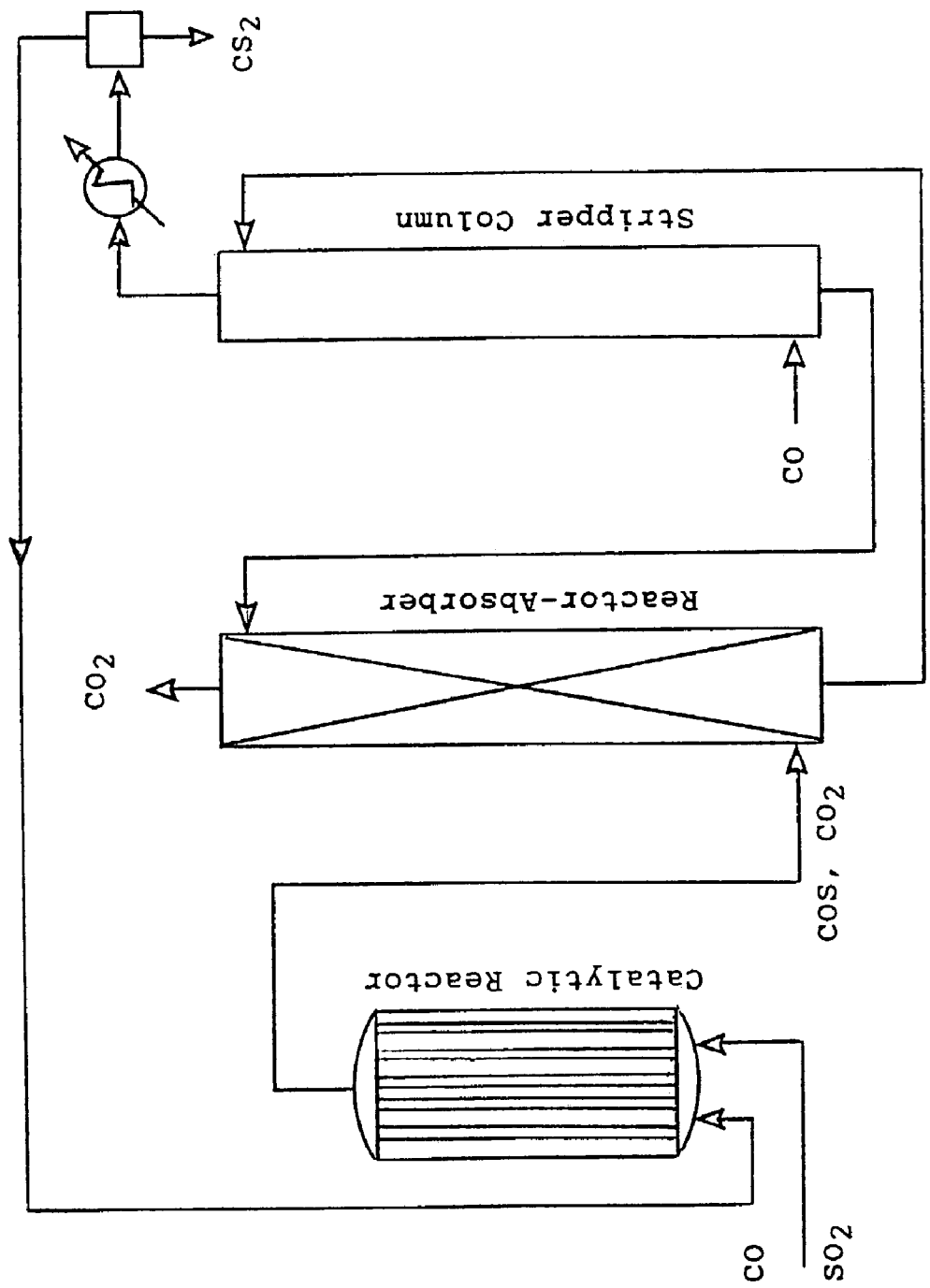
FIG. 1 is a flow diagram of the process showing two reactors, a shell-and-tube catalytic reactor, and a reactor-absorber unit. In addition, a stripper column is shown along with a condenser, phase separator, and recycle loops.

Referring now to FIG. 1, the present invention will be seen to comprise a process for producing carbon disulfide ($CS_2$) from sulfur dioxide ($SO_2$) and carbon monoxide (CO). More specifically the process incorporates a first reaction step wherein sulfur dioxide and carbon monoxide are reacted in the presence of a catalyst to form carbonyl sulfide (COS), also known as carbon oxysulfide, and carbon dioxide ($CO_2$). In a second reaction step, the carbonyl sulfide is converted over a catalyst to carbon disulfide and carbon dioxide in a disproportionation reaction. Normally this second reaction would not go to completion because of thermodynamic limitations.

The above reactions can be represented by the following equations.

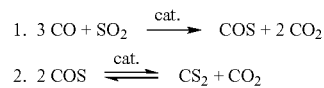

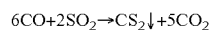

These two equations can be combined to give the following equation which represents the overall process of the invention.

$$6CO + 2SO_2 \rightarrow CS_2\downarrow + 5CO_2 \qquad 3.$$

As shown, the reaction is driven to completion by removal of the carbon disulfide.

The first reaction step illustrated by equation 1 is well known in the literature as exemplified by U.S. Pat. No. 4,122,156. This reaction is promoted by a catalyst of the type containing a reducible metal oxide. Chromium promoted iron catalyst has been found to be effective in this application. Other metal promoted catalysts, however, may be used, including nickel-molybdenum, cobalt-molybdenum, molybdenum or any combination thereof.

The thermodynamics for the first reaction step are extremely favorable. Using data for the Gibbs Energies Formation and the Enthalpies of the reactants and products shown in equation 1, the following expression was obtained.

$$\log K_P = 15{,}509\,(1/T) - 10.19 \qquad 4.$$

where $K_P$ is the equilibrium constant and T is the absolute temperature in degrees Kelvin. From this equation log $K_P$ was calculated to equal 22.38 at 200° C. and 13.07 at 400° C. Thus, as an approximation, the reaction of equation 1 can be carried out in the range of 200° to 500° C.

Also of interest is the fact that the first reaction is highly exothermic. A substantial quantity of heat must be removed from the reaction in order to control the temperature. This objective may be achieved by conducting the reaction in a shell-and-tube reactor. Alternative reactor designs, however, may be considered, for example, a fluidized bed reactor or a molten salt reactor. The heat that is recovered from this first reaction step may be advantageously used in other parts of the process notably for recovering carbon disulfide product in the stripper column.

The second reaction step presents a greater challenge because, as already noted, the reaction is reversible. Under standard conditions $K_P$ for this reaction is equal to 0.22. This value does not change much with temperature because the heat of reaction is close to zero. As a result, when pure carbonyl sulfide is reacted, the exit gas from the reactor at equilibrium contains close to 25% carbon disulfide, 25% carbon dioxide and 50% unreacted carbonyl sulfide.

The conventional approach to this problem is to recover carbon disulfide from the reactor effluent and recycle the unreacted carbonyl sulfide. The drawback to this procedure is that carbon dioxide must first be separated from the unreacted carbonyl sulfide before it can be recycled. In addition, large quantities of gas must be handled, contributing to the inefficiency of the process.

The present invention provides a unique solution to the reversibility of the second reaction. Simultaneously with carrying out this reaction, carbon disulfide is continuously removed by absorption in a solvent. In one embodiment of the invention, this result is achieved in a reactor-absorber column as shown in FIG. 1. The column contains catalyst particles which also serve as the tower packing. Thus, the catalyst not only promotes the reaction but in addition provides the surface area for contact between the liquid absorbent and the gas phase.

The exit gases from the first reactor are fed to the bottom of the reactor-absorber column. This gas stream contains carbonyl sulfide. As the gas stream passes up through the column, carbonyl sulfide is converted to carbon disulfide and carbon dioxide. The carbon disulfide is continuously absorbed in a solvent, which flows down the column. Thus, as the gases continue to pass up through the column, the concentration of carbonyl sulfide declines and approaches zero, leaving only carbon dioxide. The solvent, which exits the bottom of the column impregnated with carbon disulfide, is regenerated in a stripper column and recycled back to the reactor-absorber column.

The design of the reactor-absorber column is critical to its operation. If the catalyst is composed of the typical small spherical or cylindrical particles, the resulting bed will have a low void fraction of around 0.3 to 0.4. On the other hand, structural packing used in absorption towers achieve void fractions of 0.7 to as high as 0.97. High void fractions are desired to minimize flooding in countercurrent flow operations. The challenge therefore is to provide a catalyst bed with a maximum void fraction.

A related concern is the transfer of carbonyl sulfide from the bulk of the gas stream to the catalyst surface. The mechanism will depend on the wetting of the catalyst pellets by the solvent. If the pellets are not wetted, the carbonyl sulfide will diffuse through a gas film to surface of the pellets. Otherwise the reactant carbonyl sulfide must be absorbed by the solvent before diffusing through a liquid film.

A number of substances have been proposed as catalysts for the decomposition of carbonyl sulfide to carbon disulfide and carbon dioxide. These materials include activated alumina, silica-alumina, quartz, and kaolin. Even glass has been observed to be an effective catalyst. Although these catalysts may be acceptable in conventional processes, a more active catalyst is desired in the present invention in order to minimize operating temperatures. Candidate substances for this application are titania and alumina-titania composites, which have been shown to be highly effective in Claus plants for decomposing both carbonyl sulfide and carbon disulfide.

The absorbent must meet several requirements. Besides being a good solvent for carbon disulfide, it should have a low vapor pressure and be stable at elevated temperatures. Such heat transfer fluids as synthetic organic fluids and silicone oils are likely materials. Although the present invention contemplates the operation of the second reaction step at the lowest possible temperature, 50° C. or less, in reality temperatures as high as 250° C. must be considered. Irrespective of temperature, the application of pressure, in the range of 1 to 10 atmospheres, assists in the absorption of carbon disulfide by the solvent and helps to avoid flooding of the column packing.

The present invention has numerous attractions over the prior art. First, raw materials are readily available and relatively cheap. Gaseous materials are easier to handle than solids. Second, compared with other processes, operating temperatures are lower, and thermal efficiencies are considerably improved. Third, anhydrous conditions greatly simplify the design of a facility. Fourth, steady-state operation increases the efficiency over batch or cyclical processes. And fifth, probably the most unique aspect of the invention is the reactor-absorber column, which vastly simplifies the process.

These advantages when taken together promise to provide a process with significant savings in capital and operating costs. The result should be renewed interest in carbon disulfide as an industrial chemical.

What is claimed is:

1. A process for the manufacture of carbon disulfide comprising two reaction steps operated in tandem:
    a first reaction step in which sulfur dioxide and carbon monoxide are reacted in the presence of a catalyst to form carbonyl sulfide and carbon dioxide; and
    a second reaction step whereby the carbonyl sulfide from the first reaction step is converted to carbon disulfide and carbon dioxide in the presence of a second catalyst, the carbon disulfide is continuously removed by absorption in a solvent of silicone oil that circulates through the reaction zone, and carbon disulfide product is recovered from the solvent by stripping it with a gas.

2. A process according to claim 1 wherein the carbonyl sulfide is converted to carbon disulfide and carbon dioxide at a temperature in the range of 50° to 250° C.

3. A process according to claim 1 wherein the reaction zone of the second reaction step is maintained at an elevated pressure in the range of 1 to 10 atmospheres.

4. A process according to claim 1 wherein the reaction zone of the second reaction step is a column for countercurrent flow of the gas containing carbonyl sulfide and solvent for scrubbing carbon disulfide, said column containing packing comprising catalyst pellets that promote the reaction of carbonyl sulfide to carbon disulfide and carbon dioxide.

5. A process for the manufacture of carbon disulfide comprising two reaction steps operated in tandem:
the first reaction step in which sulfur dioxide and carbon monoxide are reacted in the presence of a catalyst to form carbonal sulfide and carbon dioxide; and
a second reaction step wherein the carbonal sulfide from the first reaction step is converted to carbon disulfide and carbon dioxide in the presence of a second catalyst, the carbon disulfide is continuously removed by absorption in a solvent that circulates through the reaction zone, and carbon disulfide product is recovered from the solvent by stripping it with carbon monoxide.

6. A process according to claim 5 wherein the second catalyst is titania.

7. A process according to claim 5 wherein the second catalyst is an alumin-titania composite.

8. A process according to claim 5 wherein the solvent in the second reaction step is a synthetic organic fluid.

* * * * *